United States Patent
Ukropec et al.

(10) Patent No.: US 10,961,892 B2
(45) Date of Patent: Mar. 30, 2021

(54) METHODS AND SYSTEMS FOR AN EXHAUST GAS AFTERTREATMENT ARRANGEMENT

(71) Applicant: Ford Global Technologies, LLC, Dearborn, MI (US)

(72) Inventors: Robert Ukropec, Herzogenrath (DE); Mario Balenovic, Waalre (NL); Maria Armiento, Aachen (DE); Jan Harmsen, Simpelveld (NL)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 16/270,402

(22) Filed: Feb. 7, 2019

(65) Prior Publication Data
US 2019/0271251 A1 Sep. 5, 2019

(30) Foreign Application Priority Data
Mar. 2, 2018 (DE) .......................... 102018203126.6

(51) Int. Cl.
*F01N 3/08* (2006.01)
*F01N 3/20* (2006.01)
(Continued)

(52) U.S. Cl.
CPC .......... *F01N 3/225* (2013.01); *B01D 53/9418* (2013.01); *B01D 53/9422* (2013.01); *B01D 53/9495* (2013.01); *F01N 3/0814* (2013.01); *F01N 3/0842* (2013.01); *F01N 3/208* (2013.01); *F01N 11/002* (2013.01); *B01D 2257/404* (2013.01); *F01N 2570/14* (2013.01);
(Continued)

(58) Field of Classification Search
CPC ........ F01N 3/225; F01N 3/208; F01N 3/0842; F01N 3/0814; F01N 3/28; F01N 3/32; F01N 11/002; F01N 9/00; F01N 13/009; F01N 2900/1402; F01N 2900/1404; F01N 2570/14; F01N 2560/06; F01N 2560/025; B01D 53/9418; B01D 53/9495; B01D 53/9422; B01D 2257/404
USPC ................... 60/286, 289, 290, 295, 299–301
See application file for complete search history.

(56) References Cited

U.S. PATENT DOCUMENTS 7,146,802 B2 12/2006 Lee
7,743,602 B2 6/2010 Kalyanaraman et al.
(Continued)

FOREIGN PATENT DOCUMENTS

JP 2006142179 A 6/2006

OTHER PUBLICATIONS

Jang. B. et al., "Low-Temperature NOx Removal for Flue Gas Cleanup," Energy Fuels, vol. 11, No. 2, Mar. 19, 1997, 5 pages.
(Continued)

*Primary Examiner* — Audrey K Bradley
*Assistant Examiner* — Dapinder Singh
(74) *Attorney, Agent, or Firm* — Geoffrey Brumbaugh; McCoy Russell LLP

(57) ABSTRACT

Methods and systems are provided for an exhaust aftertreatment system. In one example, a system comprises an air injector positioned to inject air between a first catalyst and a second catalyst in response to an oxygen concentration of an exhaust gas falling below a threshold concentration while exhaust gas temperatures are less than a threshold temperature.

19 Claims, 8 Drawing Sheets

(51) Int. Cl.
  *F01N 11/00*  (2006.01)
  *B01D 53/94*  (2006.01)
  *F01N 3/22*  (2006.01)
(52) U.S. Cl.
  CPC ............... *F01N 2900/1402* (2013.01); *F01N 2900/1404* (2013.01)

(56) References Cited

U.S. PATENT DOCUMENTS

| | | | |
|---|---|---|---|
| 8,006,481 | B2 | 8/2011 | Schmieg et al. |
| 9,163,543 | B2 | 10/2015 | Cavataio et al. |
| 2013/0312391 | A1* | 11/2013 | Cavataio ................ F01N 3/225 60/274 |
| 2014/0311126 | A1* | 10/2014 | Gandhi .................. F01N 3/101 60/274 |
| 2015/0369101 | A1* | 12/2015 | Leone ................... F02D 41/064 123/406.12 |

OTHER PUBLICATIONS

Djerad, S. et al., "Effect of oxygen concentration on the NOx reduction with ammonia over V2O5—WO3/TiO2 catalyst," Catalysis Today, vol. 113, No. 3-4, Apr. 2006, Available Online Jan. 4, 2006, 7 pages.

Zheng, Y. et al., "Enhanced Low-Temperature NOx Conversion by High-Frequency Hydrocarbon Pulsing on a Dual Layer LT-SCR Catalyst," Sae International Journal of Engines, vol. 8, No. 3, Apr. 14, 2015, 10 pages.

\* cited by examiner

METHODS AND SYSTEMS FOR AN EXHAUST GAS AFTERTREATMENT ARRANGEMENT

CROSS REFERENCE TO RELATED APPLICATION

The present application claims priority to German Patent Application No. 102018203126.6, filed Mar. 2, 2018. The entire contents of the above-listed application are hereby incorporated by reference for all purposes.

FIELD

The present description relates generally to adjusting an air flow to an aftertreatment device.

BACKGROUND/SUMMARY

Reduction of $NO_x$ is of increasing concern as emission guidelines become more stringent. Types of emission treatments may include nitrogen oxide storage catalysts, also known as NSR catalysts, (e.g., $NO_x$ storage and reduction catalyst) or a lean $NO_x$ trap (LNT) may represent one exemplary aftertreatment device for the catalytic conversion of nitrogen oxides. An alternative technology may include a selective catalytic reduction (SCR) device, which may utilize a reductant solution applied thereon to reduce nitrogen oxides.

LNT catalysts may store nitrogen oxides at lower temperatures, wherein the nitrogen oxides stored thereon may be reduced in the presence of a rich air/fuel mixture. The hydrocarbons and carbon monoxide may function as reducing agents. Contrastingly, the SCR device may increase reduction efficiency at higher temperatures, resulting in the SCR and LNT working in tandem to treat nitrogen oxide emission at a greater range of exhaust gas temperatures.

Thus, to meet the more stringent emission guidelines, it may be desired to pair the LNT catalyst and the SCR device in an exhaust gas treatment arrangement to increase a temperature range in which the nitrogen oxides may be reduced. However, internal combustion engine operating temperatures may be maintained at lower temperatures to decrease fuel consumption, which may decrease a conversion rate at the SCR.

One example approach is for increasing SCR conversion rates is shown by Cavataio et al. in U.S. Pat. No. 9,163,543. Therein, a supply of air in lean operation to the exhaust gas of an internal combustion engine upstream of an SCR catalyst is shown. More specifically, Cavataio teaches a $NO_x$ treatment device downstream of a three-way catalyst in an exhaust passage of a spark ignited engine. Air (e.g., oxygen) may be introduced into the exhaust gas in response to lean engine operating conditions that may lead to $NO_x$ production at the TWC. The air is introduced into the lean burn of a spark ignited engine, wherein the introduction of air is adjusted based on catalyst temperatures. For example, air may be introduced to cool catalysts downstream of the TWC, while maintaining a desired TWC temperature (e.g., 950° C.). Thus, if temperatures are low, such as during a cold-start, air is not introduced since the SCR catalyst temperature is too low. Additionally, Cavataio teaches an upper concentration limit of oxygen (e.g., 10%), at which air is blocked from being further introduced.

However, due to the lower combustion temperatures of diesel engines compared to spark-ignited gasoline engines, the method for introducing air in the exhaust gas may not sufficiently increase a conversion rate of the SCR. As one example, cold-start conditions may be a primary contributor to $NO_x$ emissions, where air injection would not occur in the method described by Cavataio. Thus, there remains a desire to improve a nitrogen oxide conversion rate in an SCR catalyst at low exhaust gas temperatures in an exhaust passage of a vehicle comprising a diesel engine.

The inventors have identified the above problems and come up with a way to at least partially solve them. In one example, the issues described above may be addressed by a method for a system comprising an exhaust passage fluidly coupled to an engine, the exhaust passage comprising a first catalyst upstream of a second catalyst and a controller with computer-readable instructions stored on non-transitory memory thereof that when executed enable the controller to adjust an air injection rate between the first and second catalysts in response to an exhaust gas temperature and an oxygen concentration upstream of the second catalyst. In this way, oxygen concentrations may be maintained above a lower threshold to preempt a reduction of a nitrogen oxide conversion efficiency of the second catalyst.

As one example, the first catalyst is a lean $NO_x$ trap and the second catalyst is an SCR, where aftertreatment of exhaust gas from an internal combustion engine via the SCR catalyst utilizing an increase in oxygen concentration may comprise introducing the air in response to the temperature of the exhaust gas upstream of the SCR catalyst being less than a threshold temperature and an oxygen concentration upstream of the catalyst being less than an oxygen threshold. The oxygen concentration or oxygen content in the exhaust gas upstream of the SCR catalyst may be determined and/or measured, for example via a lambda sensor and/or an exhaust gas sensor. If the temperature of the exhaust gas falls below a threshold temperature, and the oxygen concentration falls below an oxygen concentration threshold value, the oxygen concentration of the exhaust gas upstream of the SCR catalyst is increased to a concentration of at least 5 percent (5%). The exhaust gas is then supplied to the SCR catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
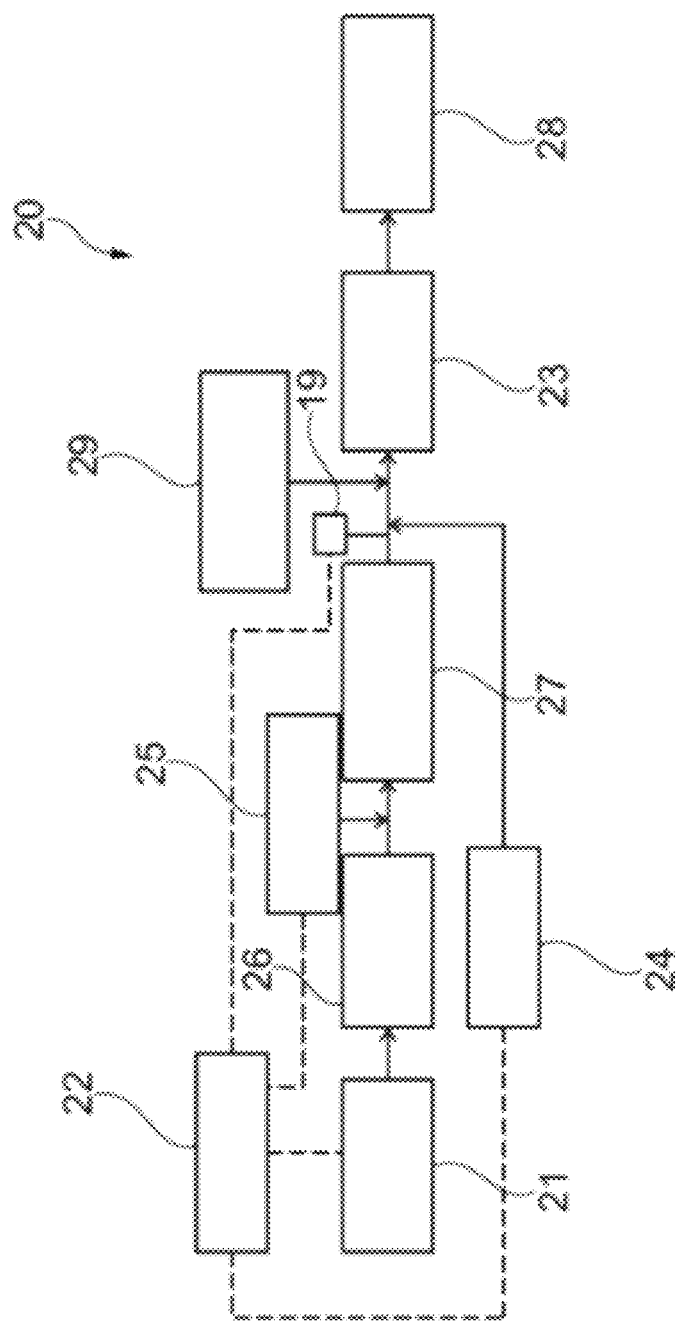
FIG. 4 shows diagrammatically an apparatus for aftertreatment of exhaust gas from an internal combustion engine.
Figure 5:
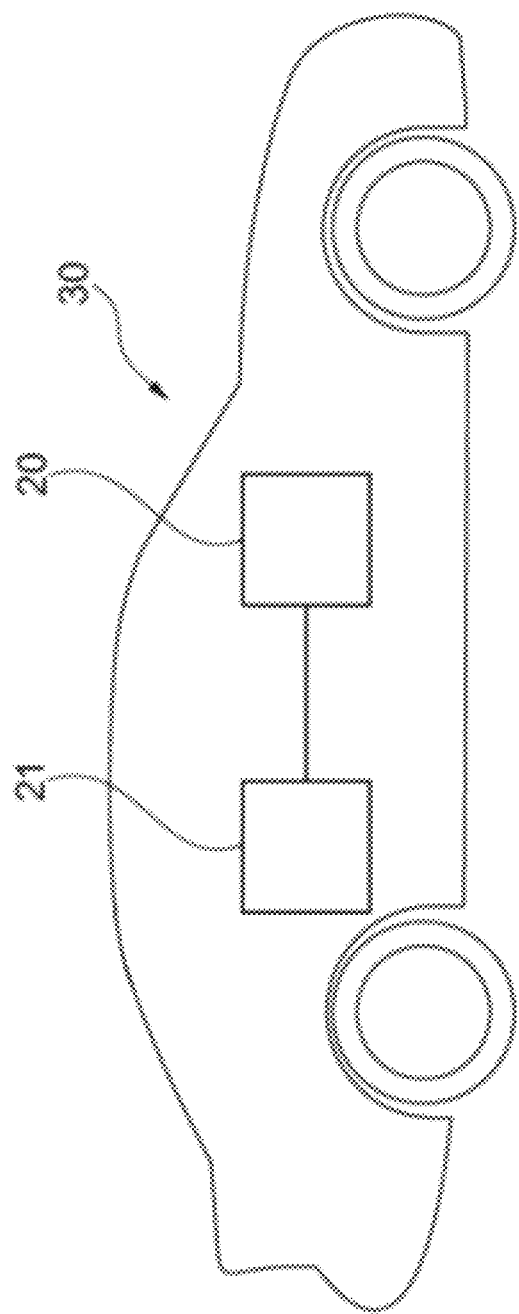
FIG. 5 shows diagrammatically a motor vehicle comprising the apparatus for aftertreatment of exhaust gas.
Figure 6:
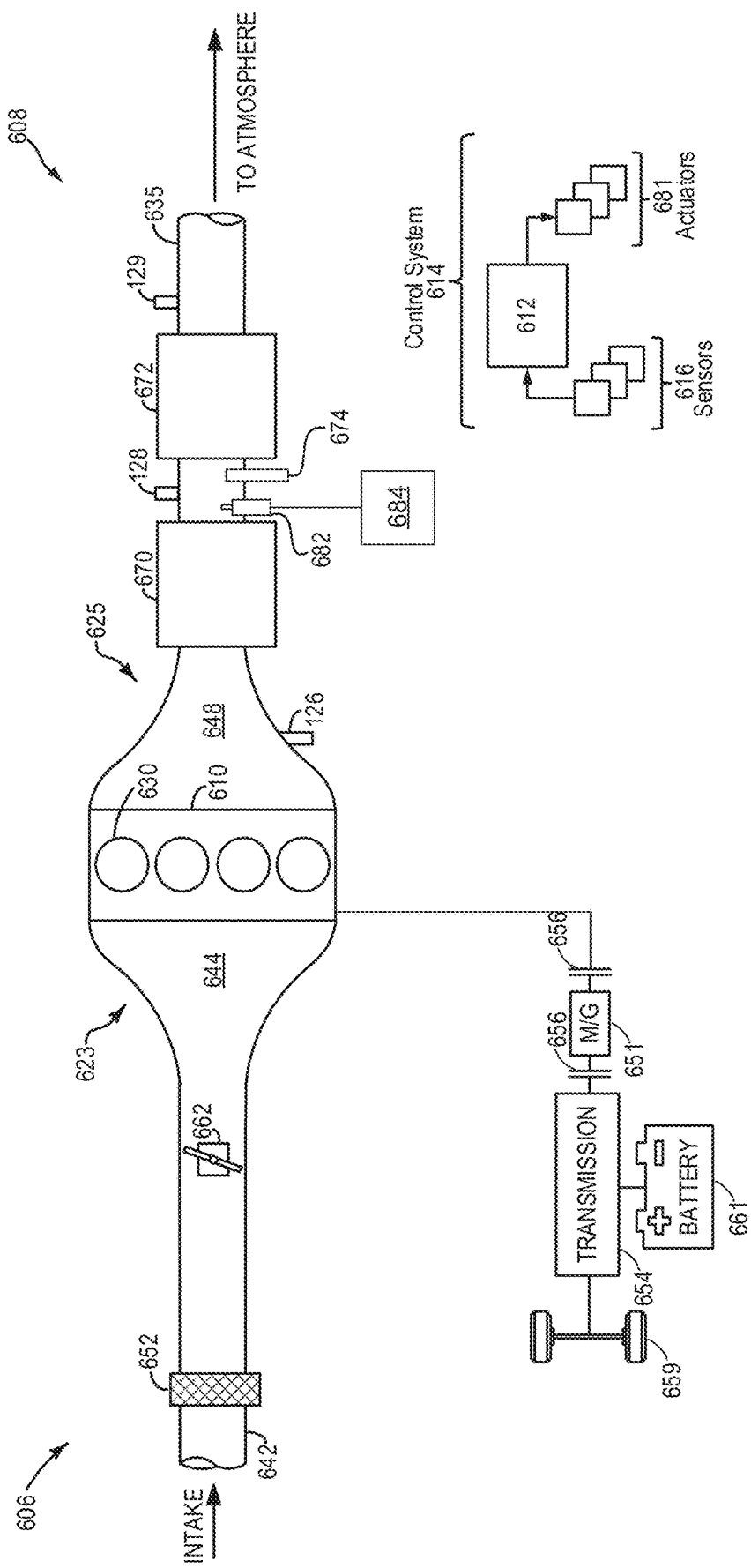
FIG. 6 shows a schematic for an engine of a hybrid vehicle.

The following description relates to systems and methods for an exhaust aftertreatment arrangement arranged in an exhaust passage. In one example, a diesel engine may be positioned to expel exhaust gases into the exhaust passage, wherein one or more aftertreatment devices arranged in the exhaust passage may reduce, oxidize, or trap one or more compounds in the exhaust gas. Examples of the aftertreatment devices are shown in FIGS. 4, 5, and 6.

Figure 1:
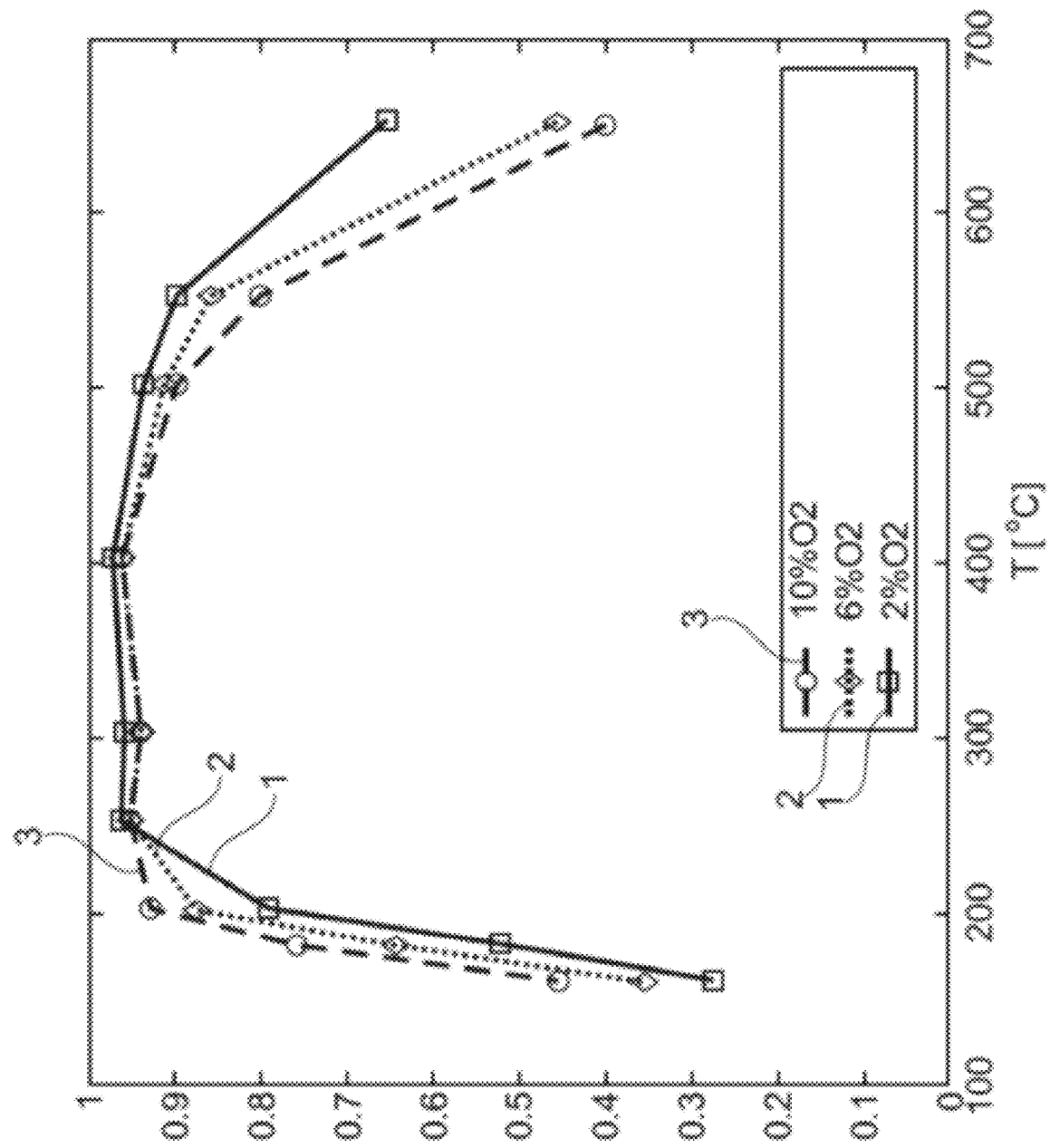
FIG. 1 shows diagrammatically the dependency of the nitrogen oxide conversion rate on the exhaust gas temperature and oxygen concentration of the exhaust gas.
Figure 2:
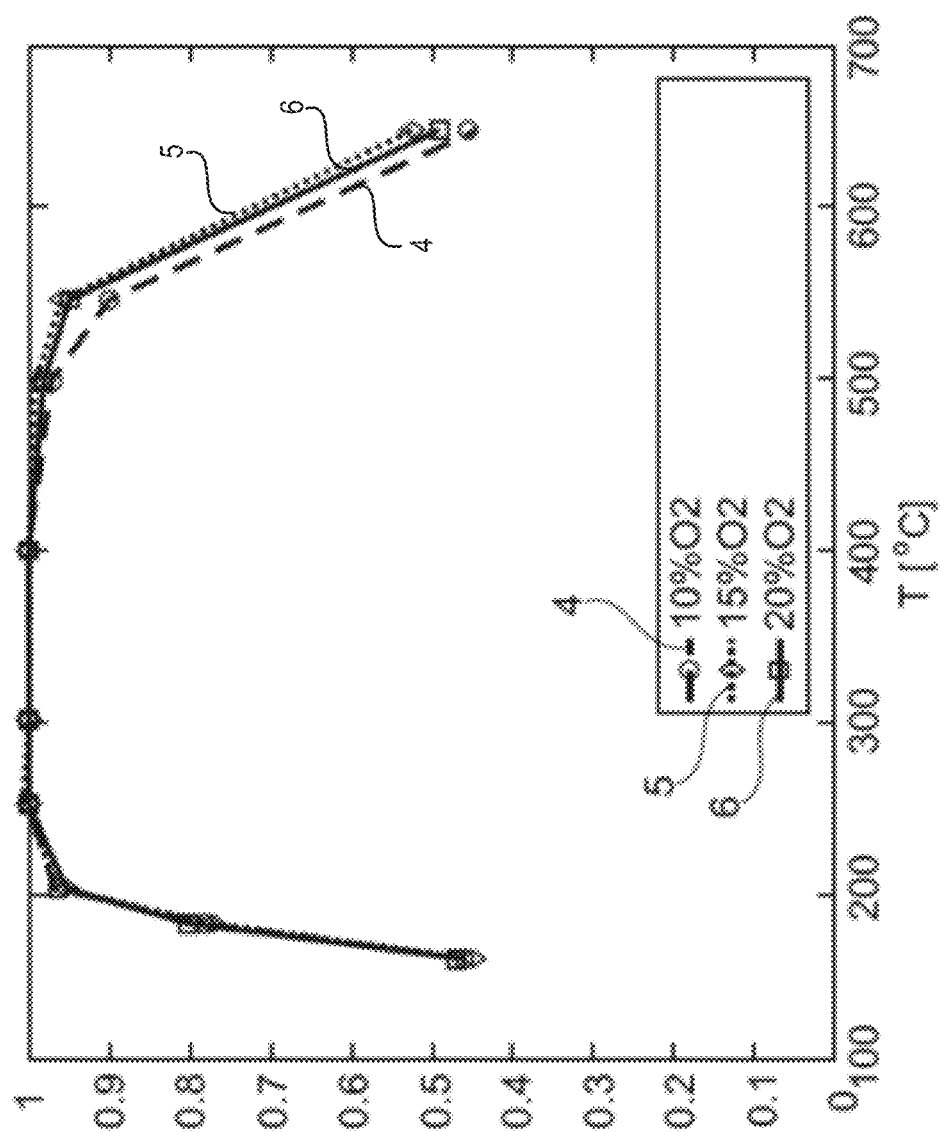
FIG. 2 shows diagrammatically the dependency of the nitrogen oxide conversion rate on the exhaust gas temperature and oxygen concentration of the exhaust gas.
Figure 3:
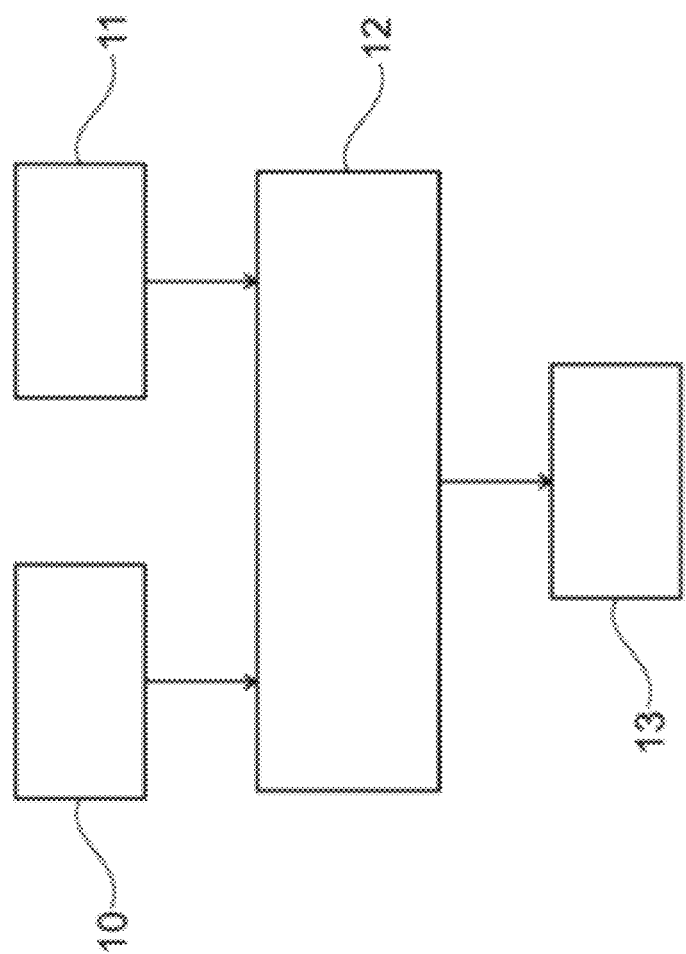
FIG. 3 shows diagrammatically a variant of the method in the form of a flow diagram.
Figure 7:
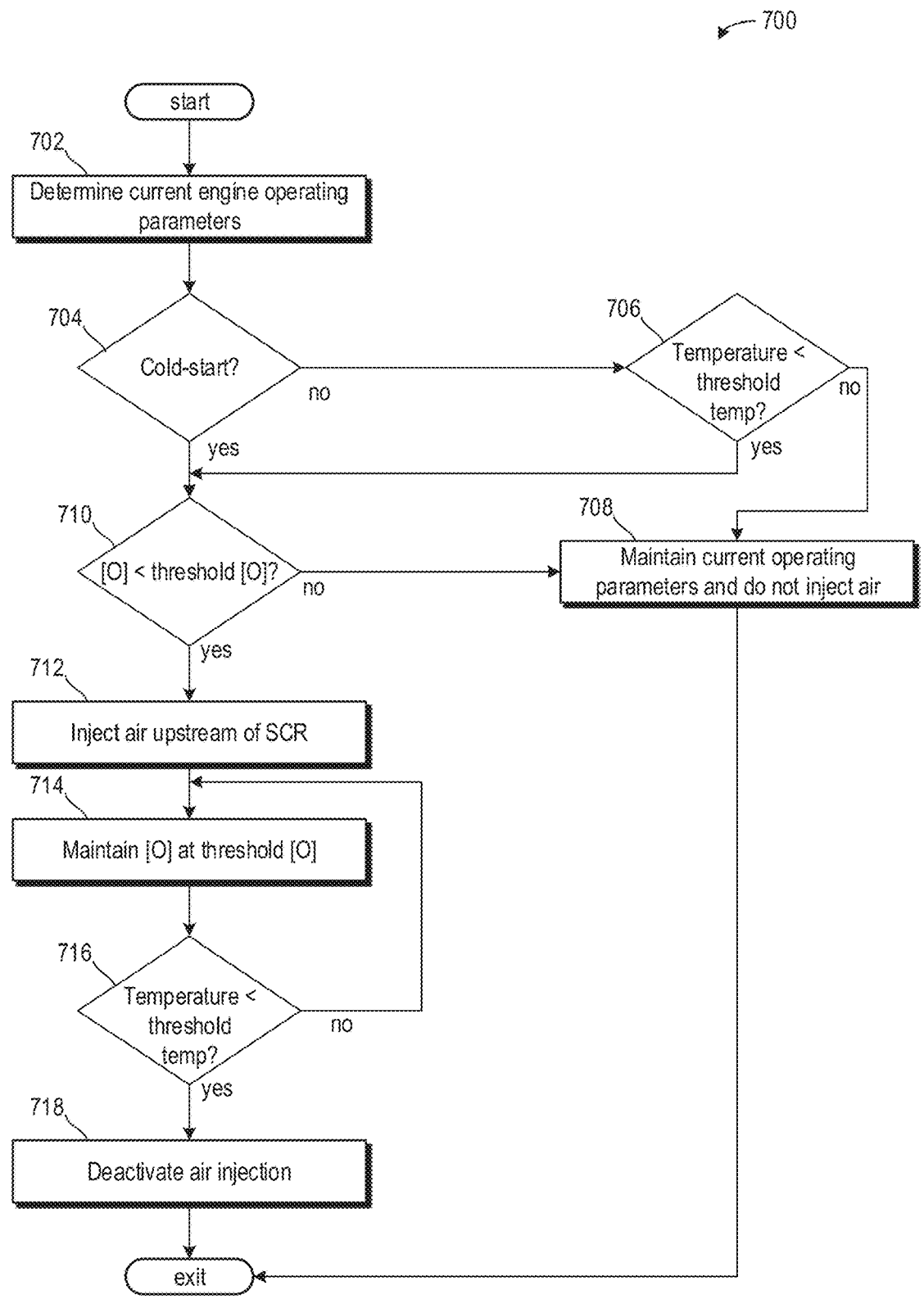
FIG. 7 shows a method for adjusting an oxygen concentration upstream of a SCR device in response to an exhaust gas temperature being less than a threshold temperature.
Figure 8:
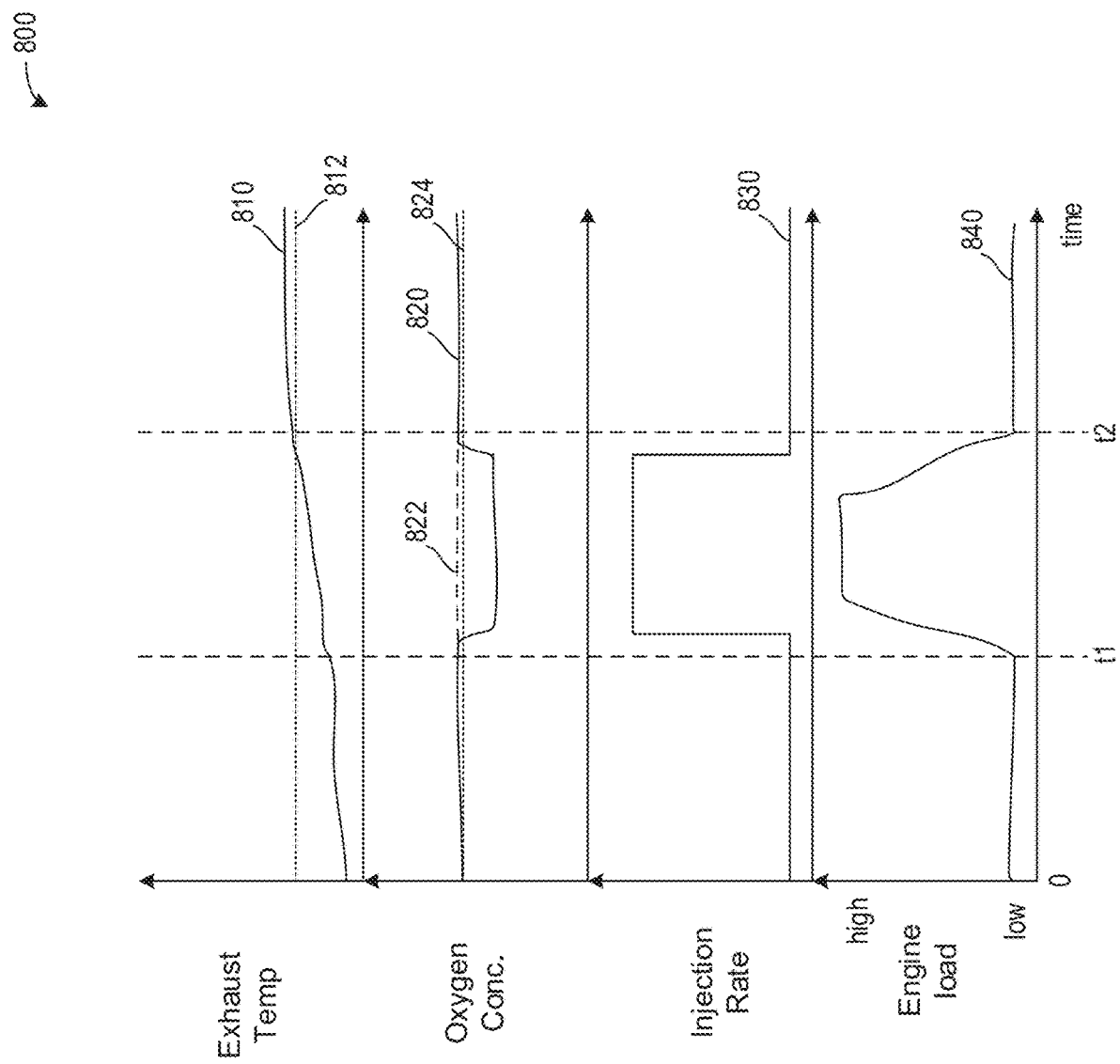
FIG. 8 shows a prophetic engine operating sequence illustrating engine operating parameter adjustments

In one example, the one or more aftertreatment devices comprises an SCR device, wherein the SCR device may depend on a concentration of oxygen to reduce nitrogen oxides. A relationship between nitrogen oxide conversion and oxygen concentration at the SCR is shown in FIGS. 1 and 2. Methods for adjusting the oxygen concentration during engine operating conditions where exhaust gas temperatures are less than a threshold temperature are shown in FIGS. 3 and 7. A prophetic engine operating sequence illustrating engine adjustments during an engine operation where oxygen concentrations fall outside of a desired range are shown in FIG. 8.

In one embodiment, the present disclosure comprises a method comprising at low exhaust gas temperatures, such as at temperatures below 250 degrees Celsius (250° C.), the nitrogen oxide conversion rate in the SCR catalyst is improved via an introduction of air. The present disclosure thus allows a high nitrogen oxide conversion rate in connection with the aftertreatment of exhaust gas, even with high fuel efficiency and the associated low exhaust gas temperatures.

In some examples, the oxygen concentration of the exhaust gas is increased to a concentration of at least 10 percent (10%) via the introduction of air. It has been found that at exhaust gas temperatures below 250 degrees Celsius (250° C.), an increase in the oxygen concentration to at least 5 percent (5%) causes a significant improvement in the nitrogen oxide conversion rate. If the oxygen concentration of the exhaust gas is increased to a concentration of at least 10 percent (10%), the nitrogen oxide conversion rate is significantly further improved.

The threshold temperature may be established based on a lower SCR treatment temperature, which may be equal to 250° C. In one example, the threshold temperature is equal to 200° C. This may promote oxygen supply only if the nitrogen oxide conversion rate has decreased because the exhaust gas temperature is too low, in one example.

Advantageously, the oxygen concentration threshold value is established as a concentration between 5 to 20%. In one example, the oxygen concentration threshold is between 5 to 15%. In one example, the oxygen concentration threshold is exactly 10%. At an oxygen concentration above 10%, the nitrogen oxide conversion rate of the SCR catalyst may not increase.

The oxygen concentration of the exhaust gas may be increased by the supply of oxygen. In some embodiments, oxygen and/or air is supplied to the exhaust gas via a nozzle and/or an injector. Here, the oxygen and/or the air may be supplied to the exhaust gas from an external source, for example from an oxygen storage apparatus. In particular, the supply of oxygen from an external source has the advantage that the quantity of supplied oxygen can be controlled precisely. Additionally or alternatively, the oxygen and/or air may be supplied from a device already arranged onboard the vehicle, such a compressor, a brake booster, a vacuum generating device, or the like.

In some examples, the oxygen supply depends on, and may be a function of, the rotation speed of the internal combustion engine and/or the load on the internal combustion engine and/or the exhaust gas temperature, and/or the air-fuel ratio. In particular, the quantity of supplied oxygen may be established depending on said parameters. The targeted supply of oxygen as a function of said operating parameters of the internal combustion engine comprises the benefit that oxygen may be supplied to the exhaust gas to the extent and at the times which contribute to an increase of the nitrogen oxide conversion rate. In one example, as the engine load increases, the supply of oxygen increases. Additionally or alternatively, as the engine speed increases, the supply of oxygen increases.

In a further variant, the oxygen concentration of the exhaust gas may be increased by controlling, in particular regulating or adjusting or adapting, at least one calibration setting of the internal combustion engine. For example, a compressor may be used, and the pressure in the compressor may be increased depending on, in particular as a function of, the rotation speed of the internal combustion engine and/or the load on the internal combustion engine and/or the exhaust gas temperature, and/or the air-fuel ratio. When a compressor is used, this may for example be a turbocharger, a supercharger or an electric compressor.

Control of at least one calibration setting of the internal combustion engine to increase the oxygen concentration of the exhaust gas has the advantage that if desired, the supply of oxygen from an external source may be omitted. In addition, control of a calibration setting also constitutes a possible option, in addition to the supply of oxygen, for increasing the oxygen concentration in the exhaust gas as a whole.

In a further variant, an exhaust gas recirculation may take place and in this context at least one calibration setting of the exhaust gas recirculation system may be controlled, in particular regulated or adapted or adjusted. For example, the time and/or duration and/or quantity of the recirculated exhaust gas, and/or the pressure of the recirculated exhaust gas, may be controlled, in particular regulated, and in this way the oxygen content of the exhaust gas may be influenced.

In addition or alternatively, a fuel injection apparatus may be used and at least one calibration setting of the fuel injection apparatus may be controlled, in particular regulated. For example, the time and/or duration and/or quantity of injection of fuel may be controlled in a targeted fashion, and in this way the oxygen content of the exhaust gas may be influenced.

At least one calibration setting of the exhaust gas recirculation system and/or the exhaust gas injection apparatus may be controlled, in particular regulated, in relation to time and/or duration and/or quantity and/or pressure of the recirculated exhaust gas or injected fuel. A targeted use of the compressor and the exhaust gas recirculation system constitutes an economic and efficient possibility for increasing the oxygen content of the exhaust gas in a targeted fashion and hence increasing the nitrogen oxide conversion rate.

The apparatus according to the disclosure for aftertreatment of exhaust gas from an internal combustion engine concerns an internal combustion engine which comprises an SCR catalyst. The apparatus comprises a device for determining, in particular measuring, the temperature of the exhaust gas and a device for determining, in particular measuring, the oxygen concentration in the exhaust gas, for example a lambda sensor. The device for determining the temperature and the device for determining the oxygen concentration are arranged upstream of the SCR catalyst relative to the flow direction of the exhaust gas. The apparatus according to the disclosure is configured to perform a method according to the disclosure as described above. For this, the apparatus according to the disclosure may comprise a correspondingly configured control device.

The internal combustion engine may be configured as a stationary internal combustion machine, for example as a stationary engine, or as an internal combustion engine for a vehicle, for a motor vehicle.

The vehicle according to the disclosure comprises an internal combustion engine and an apparatus according to the disclosure as described above for aftertreatment of exhaust gas. The vehicle may be a motor vehicle, in particular a car, a motorcycle, a truck or another motor vehicle. The vehicle may however also be a ship. In one example, the internal combustion engine is a diesel engine.

To summarize, the present disclosure allows an improved nitrogen oxide conversion rate within an SCR catalyst at low exhaust gas temperatures such as during a cold-start.

The disclosure is now explained in more detail below using exemplary embodiments with reference to the attached figures. Although the disclosure is illustrated and described in detail using preferred exemplary embodiments, the disclosure is not restricted by the examples disclosed and other variations may be derived therefrom by a person skilled in the art without leaving the scope of protection of the disclosure.

FIGS. 4-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIGS. 1 and 2 show diagrammatically the dependency of the nitrogen oxide conversion rate on the exhaust gas temperature and the oxygen concentration of the exhaust gas. In FIGS. 1 and 2, the temperature T of the exhaust gas is shown on the X-axis in degrees Celsius (° C.). The Y-axis shows the proportion of nitrogen oxide converted by an SCR catalyst. In FIG. 1, curve 1 indicates an oxygen concentration of 2 percent (2%) in the exhaust gas. Curve 2 shows an oxygen concentration of 6 percent (6%) in the exhaust gas. Curve 3 indicates an oxygen concentration of 10 percent (10%) in the exhaust gas. In FIG. 2, curve 4 indicates an oxygen content of 10 percent (10%), curve 5 an oxygen content of 15 percent (15%), and curve 6 an oxygen content of 20 percent (20%).

FIG. 1 shows that an oxygen content of 6% leads to an improvement in the nitrogen oxide conversion rate in comparison with an oxygen content of 2%. An increase in oxygen content to 10% leads to yet a further improvement. It is evident from FIG. 2 that a further increase in oxygen content to 15% or 20% leads to no further significant improvement of the nitrogen oxide conversion rate, however, these oxygen contents also do not hamper the nitrogen oxide conversion rate. In one example, the increase in nitrogen oxide conversion rates in the presence of increased oxygen concentrations apply at a temperature of less than 300 degrees Celsius (T<300° C.). More specifically, the increase in nitrogen oxide conversion rates in the presence of an increased oxygen supply may occur at temperatures corresponding to cold-start temperatures, which may be at or below a threshold temperature, such as 250° C. As such, at elevated exhaust gas temperatures above the threshold temperature, oxygen concentrations may have less of an impact on nitrogen oxide conversion rates at the SCR. As shown, 2% oxygen content, 6% oxygen content, 10% oxygen content, 15% oxygen content, and 20% oxygen content each generate substantially similar nitrogen oxide conversion rates at temperatures above about 250° C.

FIG. 3 shows diagrammatically a variant of the method according to the disclosure in the form of a flow diagram. In step 10, the temperature of the exhaust gas from an internal combustion engine is determined upstream of the SCR catalyst. This may be achieved for example by measurement using a suitable sensor, such as a temperature sensor, or thermometer. In step 11, the oxygen concentration in the exhaust gas upstream of the SCR catalyst is determined, for example measured via a lambda sensor or an exhaust gas sensor. In one example, the oxygen concentration may be sensed via a nitrogen oxide sensor. Steps 10 and 11 may be carried out simultaneously or successively in any order.

In step 12, the oxygen concentration of the exhaust gas upstream of the SCR catalyst is increased to a concentration of greater than or equal to 5%. In one example, the oxygen concentration is increased to at least 10%. If the temperature of the exhaust gas falls below a threshold temperature, for example 250° C. and in particular 200° C., and the oxygen concentration falls below an oxygen concentration threshold value for example of 10%, the air is introduced to the exhaust passage. The exhaust gas with the increased oxygen concentration is supplied to the SCR catalyst in step 13.

The oxygen concentration may be increased for example by the supply of oxygen, in particular air from an external source, for example via the nozzle. The quantity of supplied oxygen and/or the duration of the oxygen supply may be controlled, in particular regulated, depending on the rotation speed of the internal combustion engine and/or the load on the internal combustion engine and/or the exhaust gas temperature and/or the air-fuel ratio in the internal combustion engine.

Additionally or alternatively, the oxygen concentration of the exhaust gas may be increased by controlling, in particular regulating, at least one calibration setting of the internal combustion engine. If a compressor is used, for example the pressure in the compressor may be increased depending on the rotation speed of the internal combustion engine and/or the load on the internal combustion engine and/or the exhaust gas temperature and/or the air-fuel ratio. The compressor may for example be a turbocharger, a supercharger or an electric compressor. In the case of exhaust gas recirculation, this may be controlled, in particular regulated, in relation to the quantity of recirculated exhaust gas and/or the time and/or the duration of the exhaust gas recirculation and/or the pressure of the recirculated exhaust gas.

In addition or alternatively, a fuel injection apparatus may be used and at least one calibration setting of the fuel injection apparatus may be controlled, in particular regulated. Here, for example, the time and/or duration and/or quantity of injection of fuel may be controlled in a targeted fashion and in this way the oxygen content of the exhaust gas may be influenced.

FIG. 4 shows diagrammatically an apparatus according to the disclosure for aftertreatment of exhaust gas from an internal combustion engine. The exhaust gas aftertreatment apparatus 20 is configured for aftertreatment of exhaust gas from an internal combustion engine 21. The internal combustion engine 21, which may for example be an internal combustion engine or a stationary engine, is itself not necessarily part of the exhaust gas aftertreatment apparatus. It is shown in FIG. 4 merely to clarify functional correlations.

The internal combustion engine 21 may comprise an exhaust gas recirculation system and/or a charger, for example in the form of a turbocharger, supercharger or electric compressor. Furthermore, a fuel injection apparatus may be provided.

Exhaust gas from the internal combustion engine 21 is supplied to a diesel oxidation catalyst or NOx trap 26. The exhaust gas leaving the diesel oxidation catalyst or NOx trap 26 is conducted, via optional further exhaust gas aftertreatment devices 27, to an SCR catalyst 23 which may for example comprise a diesel particle filter. The exhaust gas leaving the SCR catalyst 23 may optionally be conducted via further exhaust gas aftertreatment devices 28.

Optionally, an injection apparatus 29 may be arranged upstream of the SCR catalyst for the supply of a reduction agent, for example urea. Also, in the embodiment variant shown, an apparatus 24 is arranged upstream of the SCR catalyst 23 for supplying oxygen to the exhaust gas. A device for determining the oxygen concentration 25 in the exhaust gas leaving the diesel oxidation catalyst or NOx trap 26 is also arranged upstream of the SCR catalyst 23, upstream of the apparatus 24 for supplying oxygen. Said device may for example be a lambda sensor. In the variant shown, the device 25 is arranged between the diesel oxidation catalyst or NOx trap 26 and further exhaust gas aftertreatment devices 27. Furthermore, a device 19 for determining, for example measuring, the temperature of the exhaust gas is arranged upstream of the SCR catalyst.

FIG. 4 furthermore shows an electronic control unit (ECU) 22 configured to receive signals on operating parameters, for example on rotation speed, load, air-fuel ratio or other parameters of the internal combustion engine 21. The control device 22 is furthermore configured to receive signals from the sensor 25 and signals from the temperature sensor 19. The electronic control unit 20 is furthermore configured to control the oxygen supply 24, and in particular according to the method of the disclosure, to ensure a supply of oxygen to the exhaust gas upstream of the SCR catalyst 23. Furthermore, via the control unit 22, using the method of the disclosure, at least one calibration setting of the internal combustion engine 21 may be controlled.

FIG. 5 shows diagrammatically a motor vehicle 30 according to the disclosure. The motor vehicle 30 according to the disclosure comprises an apparatus 20 according to the disclosure for exhaust gas aftertreatment. It also comprises an internal combustion engine 21. The internal combustion engine 21 is actively connected to the exhaust gas aftertreatment apparatus 20. In other words, exhaust gases from the internal combustion engine 21 are conducted to the exhaust gas aftertreatment apparatus 20 where they are aftertreated.

FIG. 6 shows a schematic depiction of a hybrid vehicle system 606 that can derive propulsion power from engine system 608 and/or an on-board energy storage device. An energy conversion device, such as a generator, may be operated to absorb energy from vehicle motion and/or engine operation, and then convert the absorbed energy to an energy form suitable for storage by the energy storage device.

Engine system 608 may include an engine 610 having a plurality of cylinders 630. Engine 610 may be used similarly to engine 21 of FIG. 4 in one example. Engine 610 includes an engine intake 623 and an engine exhaust 625. Engine intake 623 includes an air intake throttle 662 fluidly coupled to the engine intake manifold 644 via an intake passage 642. Air may enter intake passage 642 via air filter 652. Engine exhaust 625 includes an exhaust manifold 648 leading to an exhaust passage 635 that routes exhaust gas to the atmosphere. Engine exhaust 625 may include one or more emission control devices 670 mounted in a close-coupled or far vehicle underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 608 is a boosted engine system, the engine system may further include a boosting device, such as a turbocharger (not shown).

In one example, the emission control device 670 is a first emission control device arranged upstream of a second emission control device 672 relative to a direction of exhaust gas flow. A lambda sensor 674 may be arranged at a junction between the first emission control device 670 and the second emission control device 672. Additionally or alternatively, a temperature sensor 128 may also be arranged between the first emission control device and the second emission control device. Feedback from either of the lambda sensor 674 or the temperature sensor 128 may indicate a temperature and oxygen content of exhaust gas upstream of the second emission control device 672. For example, if a temperature sensed by the temperature sensor 128 is less than a threshold temperature and an oxygen concentration is less than a threshold oxygen concentration, then an air injection from injector 682 may be desired. In one example, the threshold temperature is between 200 to 300° C. In one example, the threshold temperature is exactly 250° C. The threshold oxygen concentration may be a single value or a range of values. For example, the range of values may include a lower oxygen concentration and an upper oxygen concentration, wherein the injector 682 may inject air to increase a sensed oxygen concentration to above the lower oxygen concentration and below the upper oxygen concentration. In one example, the lower oxygen concentration is 5% and the upper oxygen concentration is 20%. In some examples, additionally or alternatively, the lower oxygen concentration is equal to an oxygen concentration of a diesel exhaust gas output, which may be equal to about 6% oxygen. Thus, the engine 610 is a diesel engine, in one example.

The injector 682 may receive air from an air supply device 684. In one example, the air supply device 684 is an auxiliary device, such as a pump, and functions to only provide air to injector 682. Additionally or alternatively, the air supply device 684 may be a device already arranged onboard the vehicle 606, wherein the air supply device 684 is one or more of a compressor, a brake booster, and a vacuum generating device. The air supply device 684 may be other onboard components suitable for flowing air to an exhaust passage.

In one example, the first emission control device 670 may be used similarly to the LNT catalytic converter 26 of FIG. 4. In one example, the first emission control device 670 (herein, LNT 670) is a combination catalyst, which may comprise nitrogen oxide capturing abilities and oxidation catalyst functionality. The second emission control device 672 may be a selective catalyst reduction (SCR) catalytic converter used similarly to SCR 23 of FIG. 4. In one example, additionally or alternatively, the SCR catalytic converter may comprise particulate filter functionality in combination with the SCR functionality.

Vehicle system 606 may further include control system 614. Control system 614 is shown receiving information from a plurality of sensors 616 (various examples of which are described herein) and sending control signals to a plurality of actuators 681 (various examples of which are described herein). As one example, sensors 616 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 606. As another example, the actuators may include the throttle 662.

Controller 612 may be configured as a conventional microcomputer including a microprocessor unit, input/output ports, read-only memory, random access memory, keep alive memory, a controller area network (CAN) bus, etc. Controller 812 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Controller 612 may be used similarly to control unit 6 of FIG. 1.

In some examples, hybrid vehicle 606 comprises multiple sources of torque available to one or more vehicle wheels 659. In other examples, vehicle 606 is a conventional vehicle with only an engine, or an electric vehicle with only electric machine(s). In the example shown, vehicle 606 includes engine 610 and an electric machine 651. Electric machine 651 may be a motor or a motor/generator. A crankshaft of engine 610 and electric machine 651 may be connected via a transmission 654 to vehicle wheels 659 when one or more clutches 656 are engaged. In the depicted example, a first clutch 656 is provided between a crankshaft and the electric machine 651, and a second clutch 656 is provided between electric machine 651 and transmission 654. Controller 612 may send a signal to an actuator of each clutch 656 to engage or disengage the clutch, so as to connect or disconnect crankshaft from electric machine 651 and the components connected thereto, and/or connect or disconnect electric machine 651 from transmission 654 and the components connected thereto. Transmission 654 may be a gearbox, a planetary gear system, or another type of transmission. The powertrain may be configured in various manners including as a parallel, a series, or a series-parallel hybrid vehicle.

Electric machine 651 receives electrical power from a traction battery 661 to provide torque to vehicle wheels 659. Electric machine 651 may also be operated as a generator to provide electrical power to charge battery 661, for example during a braking operation.

Turning now to FIG. 7, it shows a method 700 for determining if an air injection is desired. Instructions for carrying out method 700 and the method included above with respect to FIG. 3 may be executed by a controller based on instructions stored on a memory of the controller and in conjunction with signals received from sensors of the engine system, such as the sensors described above with reference to FIG. 6. The controller may employ engine actuators of the engine system to adjust engine operation, according to the methods described below.

The method 700 begins at 702, which includes determining, estimating, and/or measuring one or more engine operating parameters. The engine operating parameters may include but are not limited to one or more of a manifold vacuum, a throttle position, an engine speed, a vehicle speed, an ambient temperature, and an air/fuel ratio.

The method 700 proceeds to 704, which includes determining if a cold-start is occurring. A cold-start may be occurring if an engine temperature is less than an ambient temperature. If a cold-start is occurring, a temperature of exhaust gases upstream of the SCR may be below a threshold temperature, which may correspond to a reduced nitrogen oxide conversion efficiency of the SCR unless an oxygen concentration is greater than a threshold concentration.

If the cold-start is not occurring, then the method 700 proceeds to 706 to determine if the exhaust gas temperature upstream of the SCR is below the threshold temperature. In one example, the exhaust gas temperature may fall below the threshold temperature outside of the cold-start if a vehicle operation included an engine being deactivated for a duration of time. For example, if the vehicle is a hybrid and an all-electric operation of the vehicle was executed for the duration of time, a temperature of the SCR and exhaust gases flowing thereto may fall below the threshold temperature once the engine is restarted. This may also be true if the engine is deactivated during a coasting event, DFSO, or other similar operating event where fuel delivery to the engine is blocked.

If a cold-start is not occurring and/or if the exhaust gas temperature is not less than the threshold temperature, then the method 700 proceeds to 708 to maintain current operating parameters and does not inject air.

If a cold-start is occurring or if the exhaust gas temperature is less than the threshold temperature, then the method 700 proceeds to 710 to determine if an oxygen concentration is less than a threshold oxygen concentration. The threshold oxygen concentration may be based on a concentration at which the nitrogen oxide conversion efficiency is highest when temperatures are less than the threshold temperature. As shown in FIGS. 1 and 2, the threshold oxygen concentration may be about 10%. In some example, the threshold oxygen concentration may be higher than 10% to provide an even greater excess of oxygen. Doing this may also further compensate for inaccurate sensor measurements and/or estimates. In one example, the oxygen concentration is sensed via a lambda sensor or an exhaust gas sensor arranged between an LNT and the SCR. Thus, the sensor may be arranged upstream of the SCR.

If the oxygen concentration is not less than the threshold oxygen concentration, then the method 700 proceeds to 708 to maintain current operating parameters and does not inject air.

If the oxygen concentration is less than the threshold oxygen concentration, then the method 700 proceeds to 712 to inject air upstream of the SCR. A nozzle or other injection device may be arranged between the LNT and the SCR and positioned to inject directly into the exhaust passage. In some example, the air may be supplied by an auxiliary device, such as a pump or the like. Additionally or alternatively, the air may be supplied from a compressor, brake booster, or the like. For example, as a vacuum of a brake boost is replenished, air from the brake booster is sucked out, wherein the air may be directed to the nozzle and injected into the exhaust passage.

As one real-world example, for a vehicle driving on the road, the exhaust gas temperatures may be lower than the threshold temperature in response to a cold-start and/or to city or urban driving, where vehicle speeds are relatively low and travelling distances between stops are short. In such an example, exhaust gases of the diesel engine may still be lean and above a lower threshold oxygen concentration. In one example, the exhaust gases of the diesel engine may be about 6%. However, if an engine load increases or if an acceleration occurs (e.g., a hard tip-in), then exhaust gases may be enriched to a point where the oxygen concentration falls below the lower threshold oxygen concentration. This in combination with the low exhaust gas temperatures may negatively impact a nitrogen oxide conversion rate of the SCR. However, by doping the exhaust gases with air, the oxygen concentration may be increased, which may also increase the nitrogen oxide conversion rate despite the low exhaust gas temperatures.

The method 700 proceeds to 714 to maintain the oxygen concentration at the threshold concentration.

In one example, the vehicle is a diesel vehicle, and as such, its engine operation may be lean for a majority of engine conditions. As such, the air injection may occur during engine conditions where the exhaust gas temperature is less than the threshold temperature (e.g., 250° C.) and where the oxygen concentration is less than the threshold concentration. The oxygen concentration may be less than the threshold concentration in response to an acceleration and/or a high load operation during conditions where exhaust gas temperatures are low (e.g., below the threshold temperature). The air injection may occur for only a duration of the acceleration or the high load, which may result in a short injection duration relative to an air injection in a gasoline engine attempting to achieve the same result of having an increase oxygen concentration. That is to say, the air injection on the gasoline engine may be continuous due to the engine operating at stoichiometry, while the air injection of the diesel engine described in the present disclosure may occur during only accelerations, high loads, and the like when exhaust temperatures are low. A prophetic example of a high load occurring during a cold-start is shown with respect to FIG. 8.

The method 700 proceeds to 716 to determine if the exhaust gas temperature is still less than the threshold temperature. If the exhaust gas temperature is still less than the threshold temperature, then the method 700 proceeds to continue maintaining the oxygen concentration at or above the threshold oxygen concentration. If the exhaust gas temperature is no longer less than the threshold temperature, then the SCR may be hot enough that it may convert nitrogen oxides in the presence of less oxygen than the threshold oxygen concentration. As such, the method 700 proceeds to 718 to deactivate the air injection. Additionally, even if the oxygen concentration falls below the threshold oxygen concentration while the exhaust gas temperature is at or above the threshold temperature, the air injection may not be used as the elevated exhaust gas temperature may sufficiently increase the nitrogen oxide conversion rate of the SCR.

Turning now to FIG. 8, it shows a prophetic engine operating sequence 800 graphically displaying a variety of engine conditions adjusted over time. Plot 810 represents an exhaust gas temperature and dashed line 812 represents a threshold temperature. Plot 820 represents an oxygen concentration, plot 822 represents an adjusted oxygen concentration in response to an air injection, and dashed line 824 represents a threshold oxygen concentration. Plot 830 represents an air injection rate. Plot 840 represents an engine load. Time increases from a left to a right side of the figure.

Prior to t1, the exhaust gas temperature (plot 810) is less than the threshold temperature (dashed line 812). The threshold temperature may be equal to 300° C. As such, in one example, the exhaust gas temperature is less than the threshold temperature during a cold-start. The oxygen concentration (plot 820) is slightly greater than the threshold oxygen concentration (dashed line 824). The injection rate (plot 830) is relatively low. In one example, a relatively low injection rate is substantially equal to 0. The engine load (plot 840) is relatively low. As such, lean exhaust gases may be output by the engine, resulting in the oxygen concentration being greater than the threshold oxygen concentration without an air injection occurring. At t1, the engine load begins to increase. The exhaust gas temperature continues to increase toward the threshold temperature.

Between t1 and t2, the engine load increases to a relatively high load. As such, the oxygen concentration drops below the threshold oxygen concentration. However, the injection rate is increased to a relatively high injection rate to compensate for the reduction in oxygen concentration, so that an actual oxygen concentration (plot 822) is slightly above the threshold oxygen concentration. In this way, the actual oxygen concentration represents an oxygen concentration including a combination of oxygen leftover from the engine combustion and oxygen provided due to the injection. As such, the oxygen concentration illustrated by plot 820 is an oxygen concentration resulting from only oxygen leftover from combustion (e.g., resulting exhaust gas air/fuel ratio of oxygen not consumed during combustion). In this way, a nitrogen oxide conversion efficiency of the SCR catalyst is maintained even though an air/fuel ratio of exhaust gases leaving the engine decreases. The injection rate is maintained at the relatively high rate during the entirety of the high engine load. In the example of FIG. 8, the injection rate is maintained at the relatively high injection rate for a duration of time slightly longer than a duration of time corresponding to the engine load being relatively high.

In one example, the injection rate may be adjusted to adjust the oxygen concentration to a concentration between a lower threshold concentration and an upper threshold concentration. In one example, dashed line 824 may represent the lower threshold concentration, which in the example of FIG. 8, may be a baseline oxygen concentration corresponding to lean operation of the diesel engine. The upper threshold concentration may correspond to an oxygen concentration where a nitrogen oxide conversion rate of the SCR is highest. As such, the upper threshold concentration may be equal to 10-20% oxygen. In this way, the oxygen concentration may be adjusted to be higher than at least 6% and less than 20%.

The engine load begins to decrease close to t2 and the oxygen concentration begins to increase and returns to the threshold oxygen concentration, at which point the injection rate is reduced to the relatively low injection rate. At t2, the exhaust temperature increases to a temperature greater than the threshold temperature. After t2, the exhaust temperature remains above the threshold temperature. The engine load remains relatively low. Even if the engine load were to increase to a relatively high load after t2, the injection rate may remain relatively low, as the nitrogen oxide conversion rate is less affected by the oxygen concentration when the exhaust gas temperature is higher than the threshold temperature.

In this way, an exhaust system of a diesel engine may comprise an air injection arrangement configured to increase an oxygen concentration during conditions where exhaust temperatures are low and the oxygen concentration is less than a threshold oxygen concentration. The technical effect of injecting air when the exhaust temperatures are low (e.g., less than a threshold temperature) and the oxygen concentration falls below the threshold oxygen concentration is to mitigate a reduction in a nitrogen oxide conversion efficiency of a SCR catalyst. By increasing the oxygen concentration, the nitrogen oxide conversion efficiency may be maintained.

In another representation, a method for aftertreatment of exhaust gas from an internal combustion engine via an SCR catalyst, comprises determining the temperature of the exhaust gas upstream of the SCR catalyst, determining the oxygen concentration in the exhaust gas upstream of the SCR catalyst, if the temperature of the exhaust gas falls below a temperature threshold value, and the oxygen concentration falls below an oxygen concentration threshold value, increasing the oxygen concentration of the exhaust gas to a concentration of at least 5 percent, and supplying the exhaust gas to the SCR catalyst.

A first example of the method, further includes where the oxygen concentration of the exhaust gas is increased to a concentration of at least 10 percent.

A second example of the method, optionally including any of the previous examples, further includes where the temperature threshold value is established as a temperature of maximum 250 degrees Celsius.

A third example of the method, optionally including any of the previous examples, further includes where the oxygen concentration threshold value is established as a concentration of maximum 10 percent.

A fourth example of the method, optionally including any of the previous examples, further includes where the oxygen concentration of the exhaust gas is increased by the supply of oxygen.

A fifth example of the method, optionally including any of the previous examples, further includes where oxygen and/or air is supplied by means of a nozzle.

A sixth example of the method, optionally including any of the previous examples, further includes where the oxygen supply depends on the rotation speed of the internal combustion engine and/or the load on the internal combustion engine and/or the exhaust gas temperature and/or the air-fuel ratio.

A seventh example of the method, optionally including any of the previous examples, further includes where the oxygen concentration of the exhaust gas is increased by controlling at least one calibration setting of the internal combustion engine.

An eighth example of the method, optionally including any of the previous examples, further includes where a compressor is used, and the pressure in the compressor is increased depending on the rotation speed of the internal combustion engine and/or the load on the internal combustion engine and/or the exhaust gas temperature and/or the air-fuel ratio.

A ninth example of the method, optionally including any of the previous examples, further includes where an exhaust gas recirculation takes place and at least one calibration setting of the exhaust gas recirculation system is controlled.

A tenth example of the method, optionally including any of the previous examples, further includes where a fuel injection apparatus is used and at least one calibration setting of the fuel injection apparatus is controlled.

An eleventh example of the method, optionally including any of the previous examples, further includes where at least one calibration setting of the exhaust gas recirculation system and/or the exhaust gas injection apparatus is controlled in relation to time and/or duration and/or quantity and/or pressure.

A twelfth example of the method, optionally including any of the previous examples, further includes where the apparatus comprises a device for determining the temperature of the exhaust gas and a device for determining the oxygen concentration in the exhaust gas, wherein the device for determining the temperature and the device for determining the oxygen concentration are arranged upstream of the SCR catalyst.

A thirteenth example of the method, optionally including any of the previous examples, further includes where the internal combustion engine is configured as a stationary internal combustion machine or as an internal combustion engine for a vehicle.

An embodiment of a system comprises an exhaust passage fluidly coupled to an engine, the exhaust passage comprising a first catalyst upstream of a second catalyst, and a controller with computer-readable instructions stored on non-transitory memory thereof that when executed enable the controller to adjust an air injection rate between the first and second catalysts in response to an exhaust gas temperature and an oxygen concentration upstream of the second catalyst. A first example of the system further includes where the engine is a diesel engine. A second example of the system, optionally including the first example, further includes where the first catalyst is a lean $NO_x$ trap and the second catalyst is a selective catalytic reduction device. A third example of the system, optionally including the first and/or second examples, further includes where an air injection device arranged between the first catalyst and the second catalyst, and where the air injection device comprises an injector positioned to inject directly into a portion of the exhaust passage between the first catalyst and the second catalyst. A fourth example of the system, optionally including one or more of the first through third examples, further includes where the air injection device is one or more of an air pump, a compressor, a brake booster, and a vacuum generating device. A fifth example of the system, optionally including one or more of the first through fourth examples, further includes where the instructions further enable the controller to increase the air injection rate in response to the exhaust gas temperature being less than a threshold exhaust gas temperature and the oxygen concentration being less than a threshold oxygen concentration. A sixth example of the system, optionally including one or more of the first through fifth examples, further includes where the threshold oxygen concentration is between 5-10%. A seventh example of the system, optionally including one or more of the first through sixth examples, further includes where the instructions further enable the controller to decrease the air injection rate in response to the exhaust gas temperature being greater than or equal to the threshold exhaust gas temperature independent of the oxygen concentration. An eighth example of the system, optionally including one or more of the first through seventh examples, further includes where the air injection rate is decreased to zero.

An embodiment of a method comprises increasing an oxygen concentration upstream of a selective catalytic reduction catalyst via an injector positioned to inject directly into an exhaust passage in response to the oxygen concentration being less than a threshold oxygen concentration and an exhaust temperature being less than a threshold temperature. A first example of the method further includes where increasing the oxygen concentration includes injecting air from the injector for a duration of time equal to a duration of time of an acceleration or a high engine load in response to the exhaust temperature being less than the threshold temperature. A second example of the method, optionally including the first example, further includes where ignoring the oxygen concentration upstream of the selective catalytic reduction catalyst in response to the exhaust temperature being greater than or equal to the threshold temperature. A third example of the method, optionally including the first and/or second examples, further includes where the threshold oxygen concentration is 10%. A fourth example of the method, optionally including one or more of the first through third examples, further includes where increasing the oxygen concentration further comprises injecting oxygen from the injector into a portion of the exhaust passage between the selective catalytic reduction device and a lean $NO_x$ trap upstream of the selective catalytic reduction device relative to a direction of exhaust gas flow through the exhaust passage. A fifth example of the method, optionally including one or more of the first through fourth examples, further includes where adjusting an injection flow rate of the injector based on an engine load, wherein the injection flow rate increases as the engine load increases.

An embodiment of a diesel engine comprises an exhaust passage comprising a lean $NO_x$ trap upstream of a selective catalytic reduction device relative to a direction of exhaust gas flow, a temperature sensor arranged between the lean $NO_x$ trap and the selective catalytic reduction device, an exhaust gas sensor arranged between the lean $NO_x$ trap and the selective catalytic reduction device, an injector positioned to inject air directly into a portion of the exhaust passage between the lean $NO_x$ trap and the selective catalytic reduction device, and a controller with computer-readable instructions stored on non-transitory memory thereof that when executed enable the controller to activate the injector to inject air in response to an engine operation decreasing an oxygen concentration to a concentration below a threshold concentration while an exhaust gas temperature is less than a threshold temperature. A first example of the diesel engine further includes where the engine operation includes one or more of an acceleration and an increased engine load, wherein the injector is activated to inject for an entire duration of the engine operation. A second example of the diesel engine, optionally including the first example, further includes where the threshold concentration includes a lower threshold concentration and an upper threshold concentration, and where the lower threshold concentration is 5% and the upper threshold concentration is 10%, and where the oxygen concentration is adjusted to a concentration between the lower threshold concentration and the upper threshold concentration. A third example of the diesel engine, optionally including the first and/or second examples, further includes where the oxygen concentration of the diesel engine is above the lower threshold concentration outside the engine operation with the injector being deactivated. A fourth example of the diesel engine, optionally including one or more of the first through third examples, further includes where the threshold temperature is equal to an ambient temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an exhaust passage fluidly coupled to an engine, the exhaust passage comprising a first catalyst upstream of a second catalyst; and
a controller with computer-readable instructions stored on non-transitory memory thereof that when executed enable the controller to:
adjust an air injection rate between the first and second catalysts in response to an exhaust gas temperature and an oxygen concentration upstream of the second catalyst; and
decrease the air injection rate in response to the exhaust gas temperature being greater than or equal to the threshold exhaust gas temperature independent of the oxygen concentration.

2. The system of claim 1, wherein the engine is a diesel engine, and wherein the air injection rate is further adjusted in response to engine speed.

3. The system of claim 1, wherein the first catalyst is a lean $NO_x$ trap and the second catalyst is a selective catalytic reduction device.

4. The system of claim 1, further comprising an air injection device arranged between the first catalyst and the second catalyst, and where the air injection device comprises an injector positioned to inject directly into a portion of the exhaust passage between the first catalyst and the second catalyst.

5. The system of claim 4, wherein the air injection device is one or more of an air pump, a compressor, a brake booster, and a vacuum generating device.

6. The system of claim 1, wherein the instructions further enable the controller to increase the air injection rate in response to the exhaust gas temperature being less than a threshold exhaust gas temperature and the oxygen concentration being less than a threshold oxygen concentration.

7. The system of claim 6, wherein the threshold oxygen concentration is between 5-20%.

8. The system of claim 6, wherein adjusting the air injection rate between the first and second catalysts in response to an exhaust gas temperature and an oxygen concentration includes increasing an amount of air injected in response to the exhaust gas temperature being less than a threshold temperature after fuel flow to an engine is blocked during coasting.

9. The system of claim 1, wherein the air injection rate is decreased to zero.

10. A method comprising:
increasing an oxygen concentration upstream of a selective catalytic reduction catalyst via an injector positioned to inject directly into an exhaust passage in response to the oxygen concentration being less than a threshold oxygen concentration and an exhaust temperature being less than a threshold temperature; and
ignoring the oxygen concentration upstream of the selective catalytic reduction catalyst in response to the exhaust temperature being greater than or equal to the threshold temperature.

11. The method of claim 10, wherein increasing the oxygen concentration includes injecting air from the injector for a duration of time equal to a duration of time of an acceleration or a high engine load in response to the exhaust temperature being less than the threshold temperature.

12. The method of claim 10, wherein the threshold oxygen concentration is 10%.

13. The method of claim 10, wherein increasing the oxygen concentration further comprises injecting oxygen from the injector into a portion of the exhaust passage between the selective catalytic reduction device and a lean $NO_x$ trap upstream of the selective catalytic reduction device relative to a direction of exhaust gas flow through the exhaust passage.

14. The method of claim 10, further comprising adjusting an injection flow rate of the injector based on an engine load, wherein the injection flow rate increases as the engine load increases.

15. A diesel engine comprising:
an exhaust passage comprising a lean $NO_x$ trap upstream of a selective catalytic reduction device relative to a direction of exhaust gas flow;
a temperature sensor arranged between the lean $NO_x$ trap and the selective catalytic reduction device;
an exhaust gas sensor arranged between the lean $NO_x$ trap and the selective catalytic reduction device;
an injector positioned to inject air directly into a portion of the exhaust passage between the lean $NO_x$ trap and the selective catalytic reduction device; and
a controller with computer-readable instructions stored on non-transitory memory thereof that when executed enable the controller to:
activate the injector to inject air in response to an engine operation decreasing an oxygen concentration to a concentration below a threshold concentration while an exhaust gas temperature is less than a threshold temperature; and
ignoring an oxygen concentration upstream of the selective catalytic reduction catalyst in response to the exhaust temperature being greater than or equal to the threshold temperature.

16. The diesel engine of claim 15, wherein the engine operation includes one or more of an acceleration and an increased engine load, wherein the injector is activated to inject for an entire duration of the engine operation.

17. The diesel engine of claim 15, wherein the threshold concentration includes a lower threshold concentration and an upper threshold concentration, and where the lower threshold concentration is 5% and the upper threshold concentration is 20%, and where the oxygen concentration is adjusted to a concentration between the lower threshold concentration and the upper threshold concentration.

18. The diesel engine of claim 17, wherein the oxygen concentration of the diesel engine is above the lower threshold concentration outside the engine operation with the injector being deactivated.

19. The diesel engine of claim 15, wherein the threshold temperature is equal to an ambient temperature.

* * * * *